US006993537B2

(12) United States Patent
Buxton et al.

(10) Patent No.: US 6,993,537 B2
(45) Date of Patent: Jan. 31, 2006

(54) DATA RECOVERY SYSTEM

(75) Inventors: Robert F Buxton, Chandlers Ford (GB); Stephen R Walker, Lockerley (GB); Stephen J Hobson, Hampton (GB); Paul Hopewell, Chandlers Ford (GB); Paul Kettley, Winchester (GB); Robert D Millar, Fareham (GB); Peter Siddall, Romsey (GB)

(73) Assignee: Lenovo (Singapore) Pte. Ltd., (SG)

( * ) Notice: Subject to any disclaimer, the term of this patent is extended or adjusted under 35 U.S.C. 154(b) by 485 days.

(21) Appl. No.: 10/256,093

(22) Filed: Sep. 26, 2002

(65) Prior Publication Data

US 2003/0191782 A1   Oct. 9, 2003

(30) Foreign Application Priority Data

Apr. 9, 2002   (GB)   ..................................... 0208143

(51) Int. Cl.
*G06F 7/00*   (2006.01)
(52) U.S. Cl. ...................... 707/104.1; 707/2; 395/600; 395/650; 714/2; 714/15
(58) Field of Classification Search ................... 714/2, 714/15, 23; 707/202; 395/600, 650, 575

See application file for complete search history.

(56) References Cited

U.S. PATENT DOCUMENTS

| 5,544,359 | A | * | 8/1996 | Tada et al. | ................... 707/202 |
| 6,754,842 | B2 | * | 6/2004 | Kettley et al. | ................. 714/2 |

FOREIGN PATENT DOCUMENTS

EP   0 336 546   10/1989

OTHER PUBLICATIONS

S Best, "How the Journaled File System performs logging", Proceedings of the 4th Annual Linux Showcase and Conference, Oct. 10-14, 2000.
Bullock et al, "Recovery of Data Pages after Partial Page Writes", IBM Technical Disclosure Bulletin, vol. 34, No. 3, Aug. 1991.

* cited by examiner

*Primary Examiner*—Charles Rones
*Assistant Examiner*—Belix M. Ortiz
(74) *Attorney, Agent, or Firm*—Jeffrey S. LaBaw

(57) ABSTRACT

The invention relates to the recovery of data in a database of database records, following a failure of a media containing said database. The data recovery uses a backup of the database and a log of log records detailing any changes in the database which are not captured in the backup. The log is replayed starting with the most recent log record. It is the determined for each successive log record, that relates to an operation on a database record, whether processing the log record will result in the most recent state of the corresponding database record, and if so, the log record is processed. Subsequently additional data is restored from the backup.

45 Claims, 10 Drawing Sheets

DATA RECOVERY SYSTEM

FIELD OF THE INVENTION

The present invention relates to data processing systems, and more particularly to data recovery following a media failure within such systems

DESCRIPTION OF THE RELATED ART

Even the most reliable of data processing systems are susceptible to main storage media failure (e.g. disk) resulting in loss of data from a database stored thereon. Customers rely on the ability to be able to recover such data and systems enable recoverability by periodically backing up the database to a direct access non-volatile storage device (such as a hard disk drive). A sharp copy backup may be taken or alternatively a fuzzy backup. With the sharp copy, system activity is halted whilst the backup is taken and is only restarted once the backup has finished. A log is used to record subsequent operations on the database until the next backup is taken. With a fuzzy backup, the database is copied in parallel with updates by a database engine. For both cases, at recovery time the backup is restored and then the log replayed forwards (starting with the oldest log record) to apply any subsequent changes to the database. A typical computer system 10 is shown in FIG. 1 including a database 20 which is backed up by backup component 30 and logging component 40 to disks 50 and 60.

Following a system failure resulting in the loss of a database's content it is necessary to restore it as quickly as possible from the backup copy and the log. In a volatile database, such as with message queuing, the contents of the database change rapidly so with the traditional approach of restoring the backup and then applying updates from the log in forward time sequence many redundant database updates will be made since each update may be superseded by another update or deletion.

It is known to replay the log backwards (starting with the most recent log record) following an abnormal system shutdown to restore consistency of system structure. This is disclosed in:
A paper given by Steve Best of IBM Corporation at the Proceedings of the 4th Annual Linux Showcase & Conference, Atlanta, Ga., October 2000 on the Journaled File System (JFS) Log (downloadable from http://www.usenix.org/publications/library/proceedings/als2000/full_papers/best/best_html);
European Patent 336 546; and
IBM Technical Disclosure Bulletin 91A061934 published in vol 34, no. 3, August 1991—Recovery of data pages after partial page writes.

Logging for media recovery and logging for recovery of system structure following an unclean shutdown are however two very different environments. For example, no backup copy of a database is required in the latter case. Further systems that use backwards replay on system restart do not use the same principles for recovery from media failure. For example, IBM Corporation's DB2® does media recovery by restoring from a backup, replays logs forward and then partially replays logs backwards to restore consistency.

It was realised by the inventors of the present invention that the principles used for log replay following an unclean shutdown could be applied to great effect in the very different environment of data recovery following a media failure.

SUMMARY OF THE INVENTION

Accordingly, the invention provides a method for recovering data in a database of database records, following a failure of a media containing said database, said data recovery using a backup of the database and a log of log records detailing any changes in the database which are not captured in the backup, the method comprising the steps of: replaying the log, starting with the most recent log record; determining for each successive log record, that relates to an operation on a database record, whether processing the log record will result in the most recent state of the corresponding database record, and if so, processing the log record; and subsequently restoring additional data from the backup.

This is completely contrary to the normal mode of operation following a media failure and is advantageous since because the most recent log record relating to a database record is processed, processing power is not wasted in making changes to the database that will be superseded by subsequent changes recorded in the log.

The invention preferably applies to both the transactional and non-transactional environments. The transactional environment is more complex because database records can be indoubt (i.e. the final status is unknown and depends on another resource manager.)

In the transactional embodiment some of the log records are control records and each control record is associated with at least one operation. Based on the existence or absence of at least one particular control records, it is possible to determine the status of an operation (e.g. if an operation is associated with an End phase II control record, then that operation has committed). The status of an operation is preferably used in the determining.

In the transactional embodiment, the status of each operation can be one of committed; aborted; inflight; and indoubt. Indoubt database records are marked as such. If it is determined that a log record relates to an indoubt delete operation, it is preferably recorded that a delete on the corresponding database record is indoubt. In this instance, it is preferably necessary to restore the next most recent log record to ensure that the restored database has the most recent copy of the record therein, but to mark this record as indoubt to indicate that it is not currently available.

In such an embodiment, it is possible to determine that there is a log record denoting an operation on a database record for which there is an indoubt delete operation pending. It is also possible to determine whether the denoting log record is for a committed operation and is the most recent successive log record following the indoubt delete log record. If this is true, the log record is then processed.

In the transactional embodiment, having replayed the log, data is preferably restored from the backup. This preferably involves determining for which database records, no operations were processed during the log replay step; determining which of said database records for which no operations were processed, were of committed status at the time of the backup; and restoring those committed records.

Further preferably restoration of the backup comprises: determining from the backup the initial status (i.e. the status of the record in the backup) of each non-committed database record for which no operations were processed during the log replay step; determining from the log the final status of each non-committed database record; and determining whether to restore said non-committed database records from the backup based on said final status thereof.

According to another aspect the invention provides a method for recovering transactional data in a database following a failure of a media containing said database said data recovery using a backup of the database and a log of log records detailing any changes in the database which are not captured in the backup, the method comprising the step of: replaying the log, starting with the most recent log record; for each successive log record, that relates to an operation on a database record, determining whether processing the log record will result in the most recent state of the corresponding database record, and if so, processing the log record, the operation having a status which is used in the determining; and subsequently restoring additional data from the backup.

According to another aspect, the invention provides an apparatus for recovering data in a database of database records, following a failure of a media containing said database, said data recovery using a backup of the database and a log of log records detailing any changes in the database which are not captured in the backup, the apparatus comprising the steps of: means for replaying the log, starting with the most recent log record; means for determining for each successive log record, that relates to an operation on a database record, whether processing the log record will result in the most recent state of the corresponding database record, and if so, processing the log record; and means for subsequently restoring additional data from the backup.

According to another aspect, the invention provides an apparatus for recovering transactional data in a database following a failure of a media containing said database, said data recovery using a backup of the database and a log of log records detailing any changes in the database which are not captured in the backup, the apparatus comprising: means for replaying the log, starting with the most recent log record; for each successive log record, that relates to an operation on a database record, means for determining whether processing the log record will result in the most recent state of the corresponding database record, and if so, processing the log record, the operation having a status which is used by the determining means; and means for subsequently restoring additional data from the backup.

According to another aspect, the invention provides a system for recovering data in a database of database records, following a failure of a media containing said database, said data recovery using a backup of the database and a log of log records detailing any changes in the database which are not captured in the backup, the system comprising: means for replaying the log, starting with the most recent log record; means for determining for each successive log record, that relates to an operation on a database record, whether processing the log record will result in the most recent state of the corresponding database record, and if so, processing the log record; and means for subsequently restoring additional data from the backup.

According to another aspect, the invention provides a system for recovering transactional data in a database following a failure of a media containing said database, said data recovery using a backup of the database and a log of log records detailing any changes in the database which are not captured in the backup, the system comprising: means for replaying the log, starting with the most recent log record; for each successive log record, that relates to an operation on a database record, means for determining whether processing the log record will result in the most recent state of the corresponding database record, and if so, processing the log record, the operation having a status which is used by the determining means; and means for subsequently restoring additional data from the backup.

It will be appreciated that the invention may be implemented as a computer program.

BRIEF DESCRIPTION OF THE DRAWINGS

A preferred embodiment of the present invention will now be described, by way of example only, and with reference to the following drawings.

DETAILED DESCRIPTION

Figure 1:
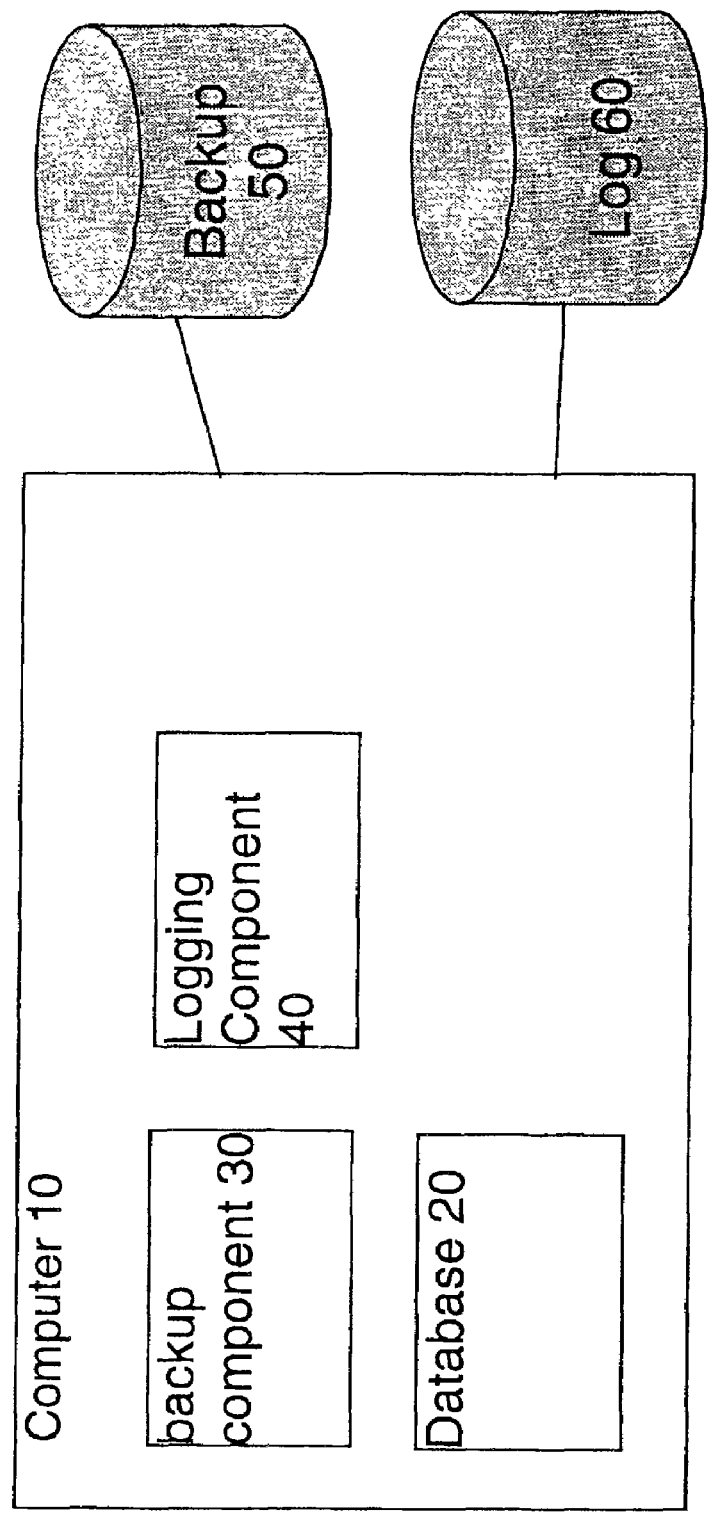
FIG. 1 shows a data recovery system according to the prior art.

As previously mentioned, in a volatile database, the contents of the database change rapidly so with the traditional approach of restoring the backup and then applying updates from the log in forward time sequence many redundant data base updates will be made since each update may be superseded by another update or deletion.

Thus by replaying the log backwards only the latest version of any record is applied to the database and consequently unnecessary updates are avoided.

A preferred embodiment of the invention will first be described, with reference to FIGS. 2a and 2b, for a non-transactional environment.

Recovery starts with an empty database 130 to restore into. Each record in the database that is being recovered (not shown) is assigned a unique identifier. A key table 110 is maintained during the recovery process.

The process begins by reading the merged logs (one shown 120) from all of the systems that have updated the database starting from the time the failure was detected going backwards through the logs until the time that the most recent successful backup 100 of the database was started.

The log records contain an indication of the operation performed (insert/update/delete), the unique key of the database record, and for insert and update log records the complete content of the database record. Delete log records do not contain the content of the database records. Some database systems only log the changed portion of Updated data base records in which case it would be necessary to keep track of which portions of the record had been restored to the database—

This additional complexity is not described in the following description.

The restoration process is described with reference to FIG. 2b and is summarised below:

For each record on the log, its type is determined and processed accordingly (step 200).

For Delete log records, an entry is created in the Key table for the database record being deleted (step 210).

For Insert log records

If no entry was found in the Key table this indicates a database record that has never been updated or deleted so it is added to the database (step 220, 240).

If an entry was found in the key table, then that record was processed more recently and so there is no need to process the older operation on the same record. The entry is removed from the key table (since no more records for the key will be found on the log) (step 220, 230)

For Update log records

If no entry was found in the Key table for the record (step 250), this indicates that this database record that has never been subsequently updated or deleted (i.e. it is the most recent copy) so it can be added to the database (step 260) and an entry made in the key table (step 280).

If an entry was found in the key table (step 250), then this is not the most recent operation on the record and so it does not need to be processed (step 270).

An example will now be described with reference to both FIGS. 2a and 2b. In FIG. 2a, log 120 shows a number of delete (−), insert (+) and update (*) operations. The process starts with the most recent record (−I) and determines the operation logged (step 200). In this instance, the operation is a delete of record I and so an entry for I is created (using I's unique identifier) in the key table 110). D and C are also logged as having been deleted, so entries for these two records are also placed in the key table. Record A is then updated so at step 230 it is determined whether an entry exists in the key table for this record. It does not, so is added to the empty database (step 1 of FIG. 2a and step 260 of FIG. 2b) and an entry is created in the key table (step 280). B is then updated and thus the same processing occurs. It does not already exist in the key table (step 250) and so is added to the database 130 (step 2 of FIG. 2a and step 260 of FIG. 2b) and an entry is created in the key table (step 280) Another update for record A is then encountered. It is determined at step 250 that A was updated more recently (i.e. there is already an entry for it in the key table). Since the most recent copy of A is already in the database, there is no point in adding the older copy to the database. Thus nothing is done with this record (step 270).

The next logged record is an insert for I. It is determined at step 220 of FIG. 2a that there is already an entry in the key table 110 for this record (it has been deleted). This is the first occurrence of the record and so it will not be re-encountered. Thus its entry in the key table is deleted (step 230).

Having dealt with record I, the next logged operation is an insert of record E. This record has never previously been encountered and so does not appear in the key table. An operation on that record is not going to appear again and so does not need to be added to the key table. However a record for E does have to be added to the database (step 240).

The final operation to process is an insert for record C. This record was more recently deleted and so does appear in the key table (step 220). For the same reason that I's entry could be deleted from the key table, so can C's entry (step 230).

After the log has been replayed then the remaining records can be restored from the backup.

For each database record found in the backup

If no entry was found in the Key table this indicates a database record that has never been subsequently updated or deleted so it is added to the database.

If an entry was found in the key table, then either the most recent version is in the database or the record has been deleted. Consequently, there is no need to process the record.

Figure 2A:
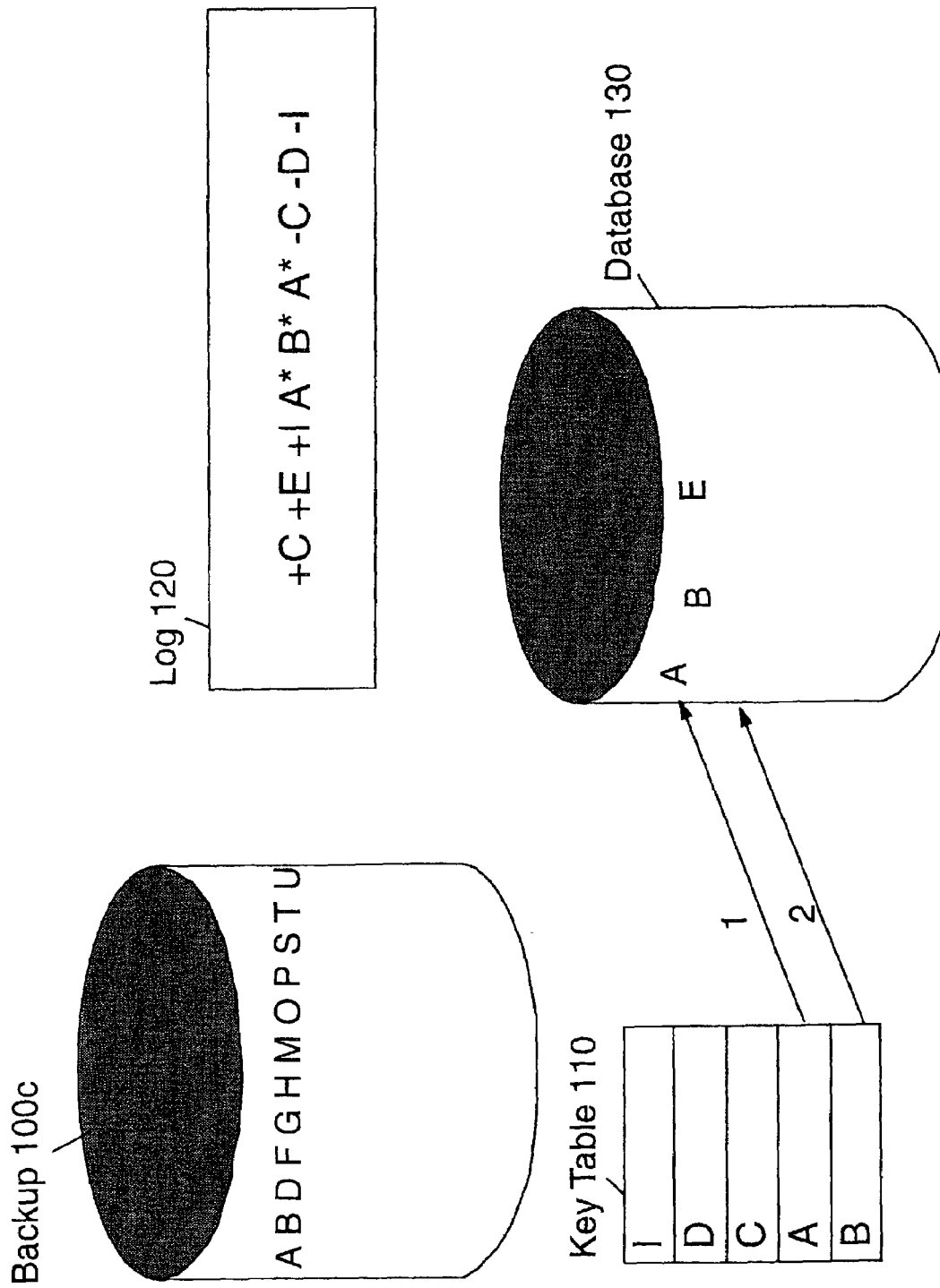
FIGS. 2a and 2b show data recovery in a non-transactional environment according to a preferred embodiment of the present invention.
Figure 2B:
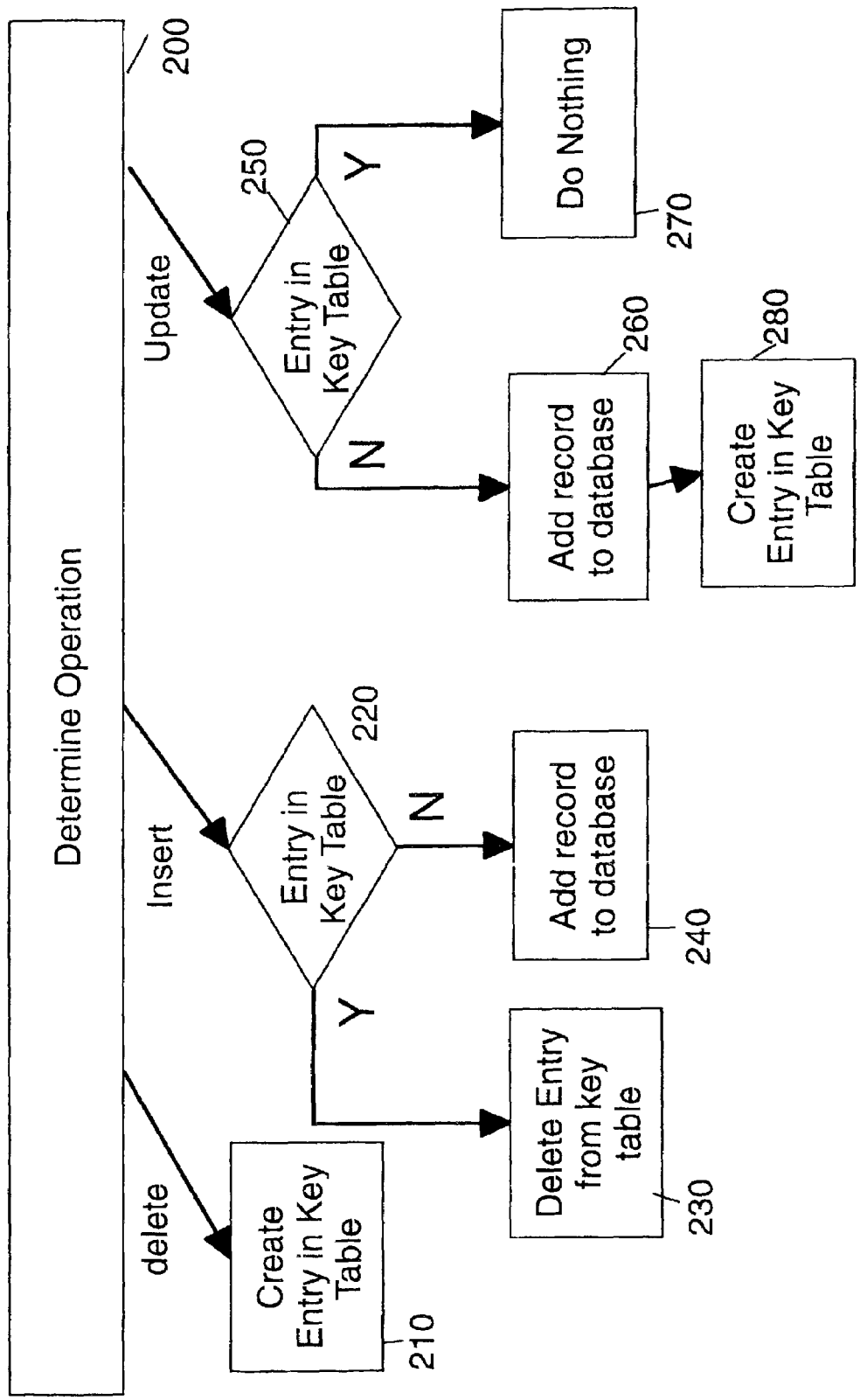

Thus with reference to FIG. 2a, backup 100 is used to create the up to date version of database 130. A, B and D all have entries in the key table. Therefore they are not added from the backup 100 to the new database 130. All other records are added in.

The transactional environment is more complex because of the need to consider whether a unit of work (UOW) committed, aborted or remains indoubt waiting for co-ordination with another recovery manager and to restore updates that were indoubt at the time of failure back to the indoubt state after the restore is complete.

The database recovery again starts with an empty database (recovery database) to restore into. This time two tables are maintained during the recovery process—a key table and a unit of work (UOW) table. The UOW table stores the final status recorded on the log of the units of work under which changes (deletes, updates, inserts) are made. The possible status for a UOW are:

Committed—The UOW completed normally

Aborted—The UOW failed and all updates made are backed out

Inflight—The UOW had not completed. For recovery purposes this is the same as Aborted Indoubt—The final status is unknown and depends on another resource manager.

The Key table records the unique identifier assigned to a record on the database and the status of the associated UOW.

The process starts by reading the merged logs from all of the systems that have updated the database starting from the time the failure was detected going backwards through the logs until the time that the most recent successful backup of the database was started.

Figure 3A:
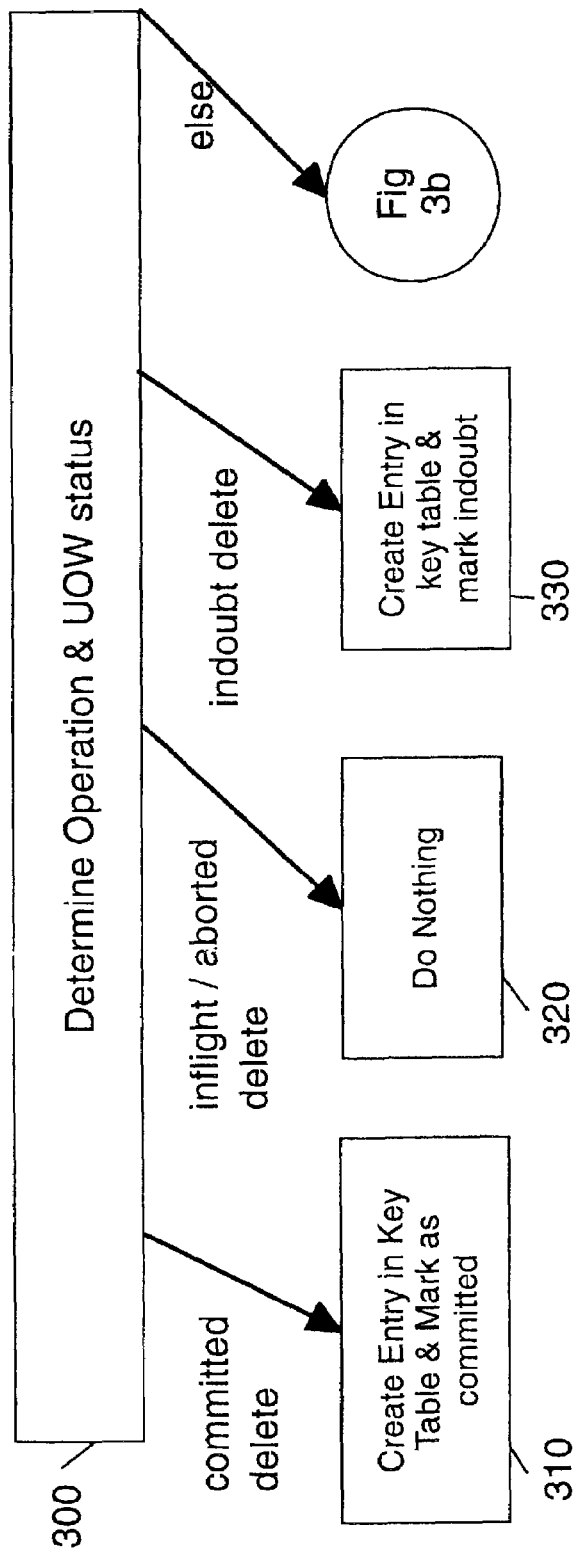
FIGS. 3a, 3b and 3c show the processing involved in replaying the log backwards in a transactional environment in accordance with a preferred embodiment of the present invention.
Figure 3B:
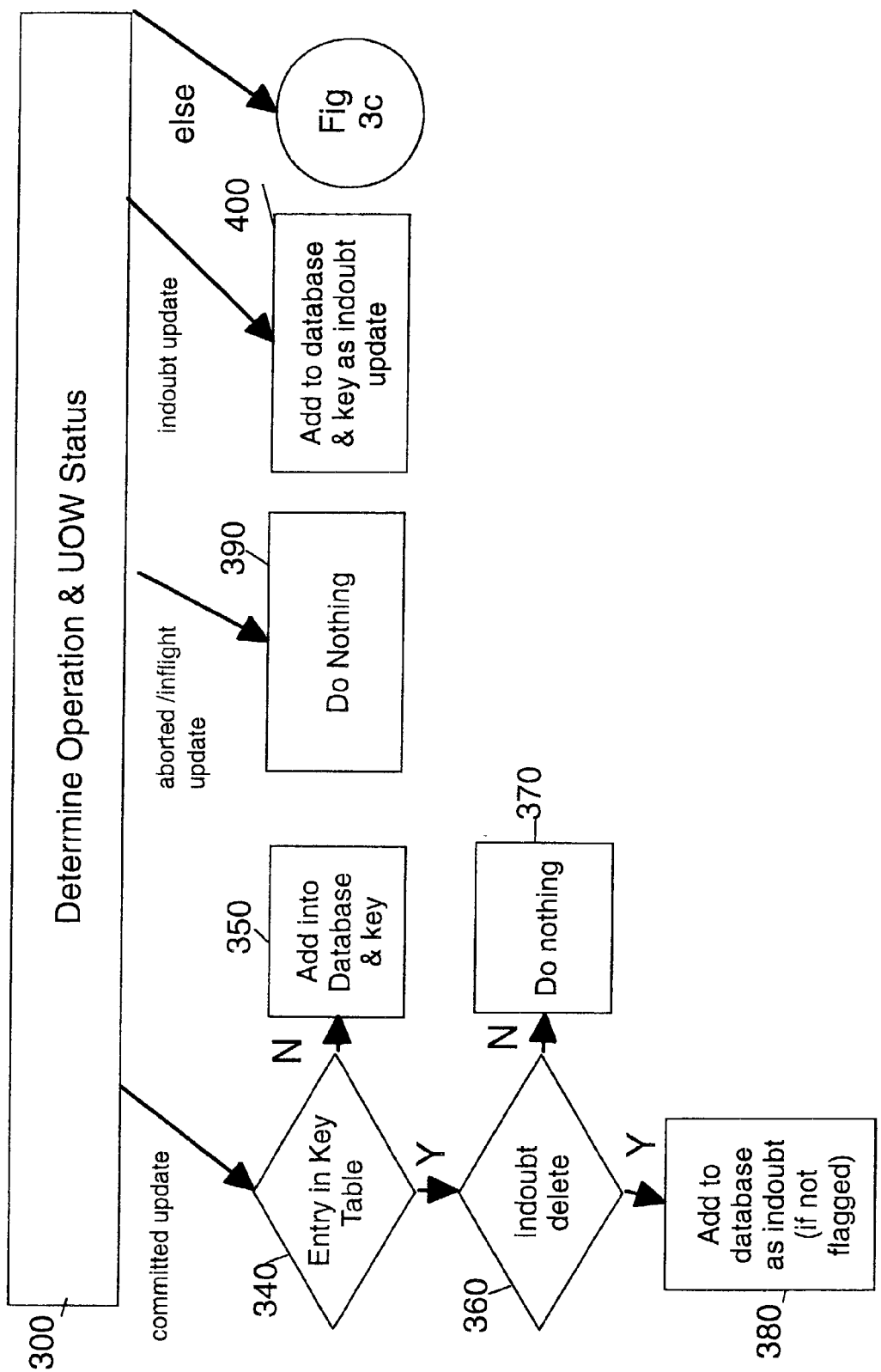
Figure 3C:
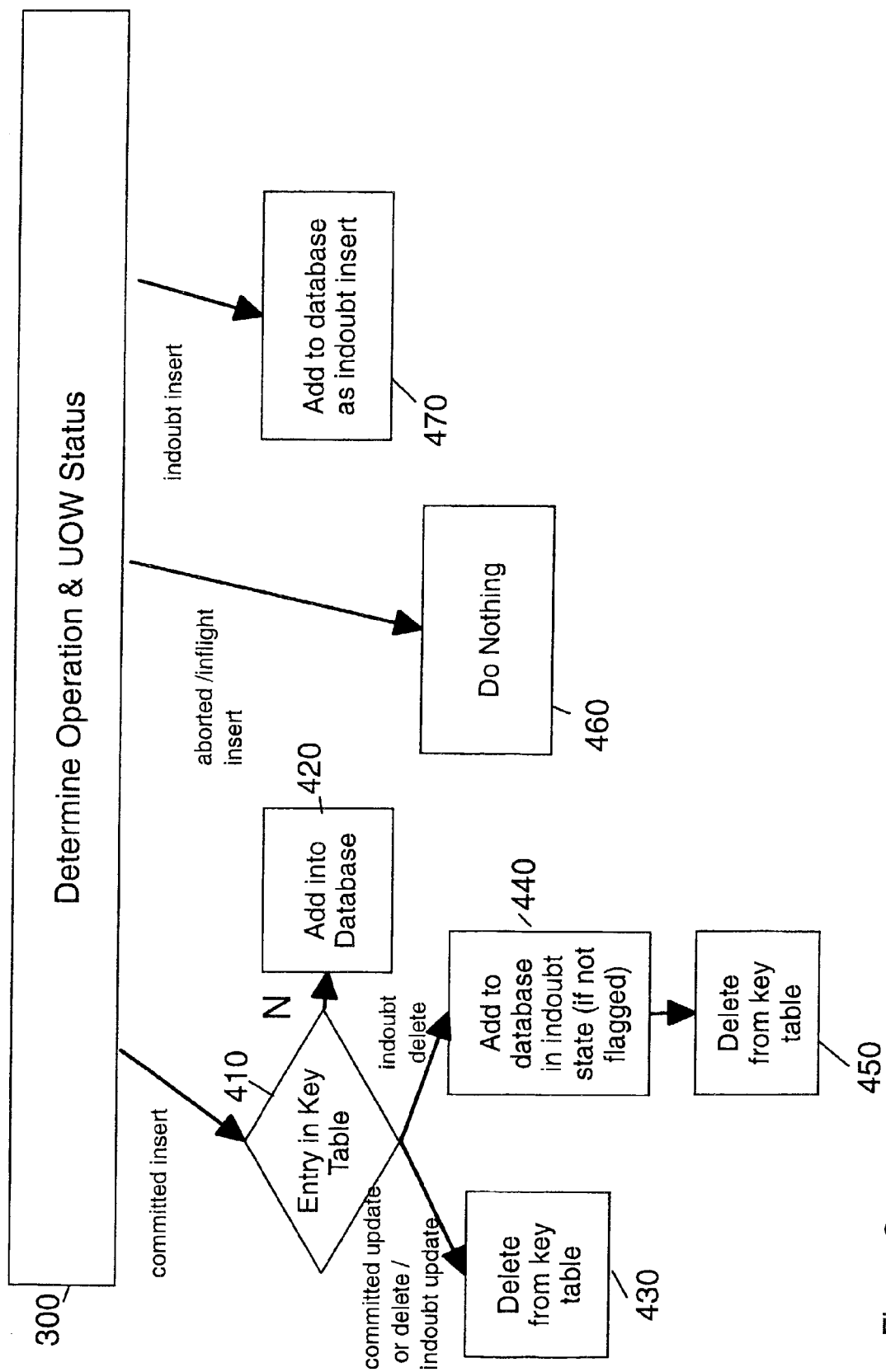

For each record on the log denoting an operation, Its type (e.g. Insert, update, delete) and the status of the associated UOW (e.g. Committed) is determined and processed accordingly. (Note, the process of adding entries to the UOW table will be described later). This processing 300 will now be discussed with reference to FIGS. 3a, 3b and 3c.

For Delete log records, the status of the associated UOW is determined from the UOW table For committed or indoubt delete records an entry is created in the key table for the record being deleted and its status is marked (step 310/330)

For inflight/aborted UOWs, there is no processing (step 320), since for recovery purposes, neither of these operations ever happened.

For Update log records, the status of the associated UOW is determined from the UOW table For a committed update it is determined whether an entry exists for that record in the key table (step 340). If no entry exists this indicates that the database record in question has never been subsequently updated or deleted so it is added to the database and the key table (step 350).

If an entry was found in the key table and was for a committed delete or for a indoubt/committed update, then there is no need to do anything (step 360, 370). This is because if the entry is for a committed or indoubt update, this update is more recent and so should not be overwritten; and a more recent committed delete means that the record no longer exists.

If an entry was found in the key table and was for an Indoubt delete (step 360), the record needs to be added to the database and marked therein as indoubt and the entry for that indoubt delete in the key table flagged (step 380). (Note, the record is only added if the indoubt delete entry is not already flagged in the key table. A flagged entry indicates that the most recent copy of the record is already in the recovery database.) This is because this committed update is the most recent copy of the record and since it has not yet finally been deleted, this record still needs to exist in the database.

For an aborted/inflight update, there is no need to do anything. (step 390) For recovery purposes, neither of these operations ever happened.

For an indoubt update, the record is added to the database (marked as being indoubt) and also recorded in the key as indoubt (step 400). (If an indoubt operation is logged for a record, it can be assumed that this is the most recent operation on that record (otherwise the operation would have committed)).

For Insert log records, the status of the associated UOW is determined from the UOW table For a committed insert, it is determined whether there is already an entry in the key table (step 410). If there isn't, then this is the first occurrence of the record in question. Thus it is added into the database (step 420)

If there is an entry in the key table, it is determined what this relates to:

If it relates to a committed update or delete, or relates to an indoubt update, then the entry is deleted from the key table (step 430). This is because the most recent copy of the record is already in the database, and the record will not be encountered again (an insert is always the first operation on a record).

If an entry was found in the key table and was for an Indoubt delete, the record needs to be added to the database but marked as being indoubt (step 440). (Note, the record is only added if the indoubt delete entry is not flagged in the key table. A flagged entry indicates that the most recent copy of the record is already in the recovery database.) This is because the committed insert is the most recent copy of the record and needs to be available until the indoubt delete on the record is committed. The entry relating to the committed insert can be deleted from the key table (step 450). This is because it is the first occurrence of the record.

For an inflight/aborted insert the database record is ignored (step 460). This is because for recovery purposes, this record never happened.

For an indoubt insert the record needs to be added but marked as being indoubt.

As mentioned above, the status (committed, aborted/inflight, indoubt) associated with a UOW in which a record occurs determines how that record is processed. A UOW table is used to determine a record's final state. All records include their UOW id and thus can be cross-matched with an entry (if it exists) in the UOW table. UOW control records and the maintenance of the UOW table will now be discussed with reference to FIGS. 4 and 5.

Figure 4:
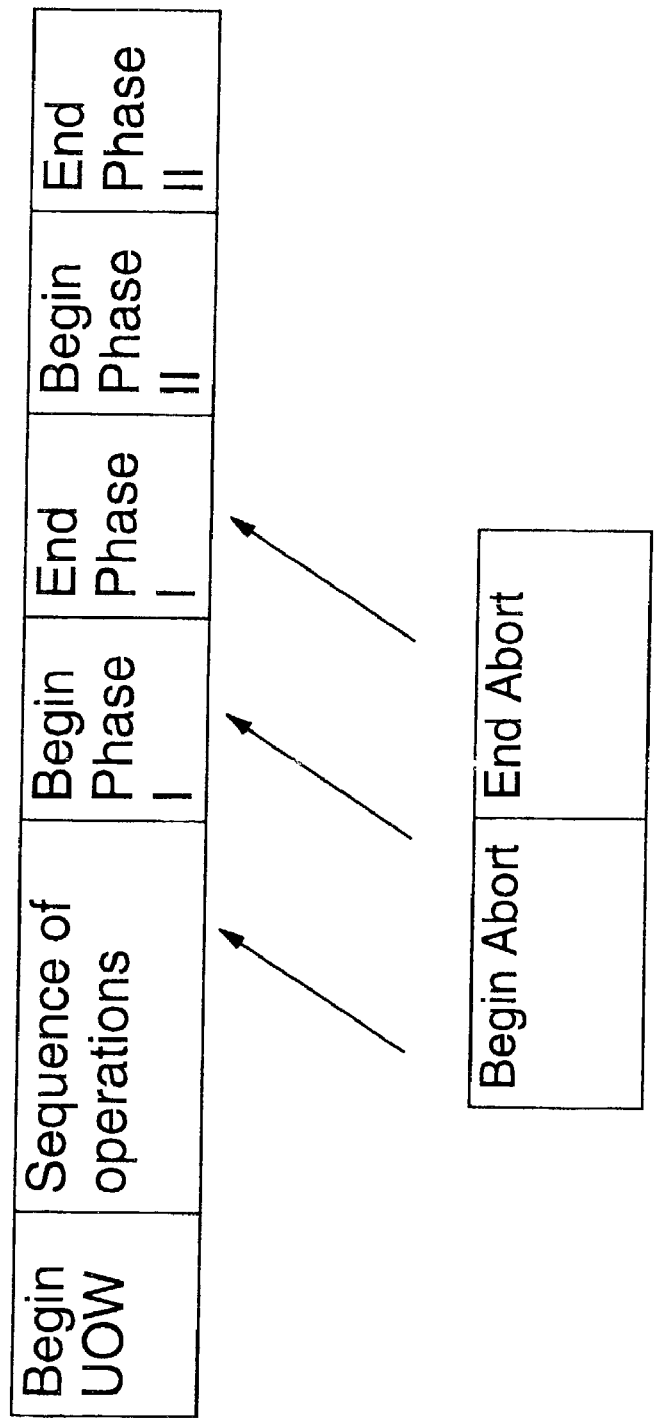
FIG. 4 shows the records written to the log in a system using the two-phase commit protocol.
Figure 5:
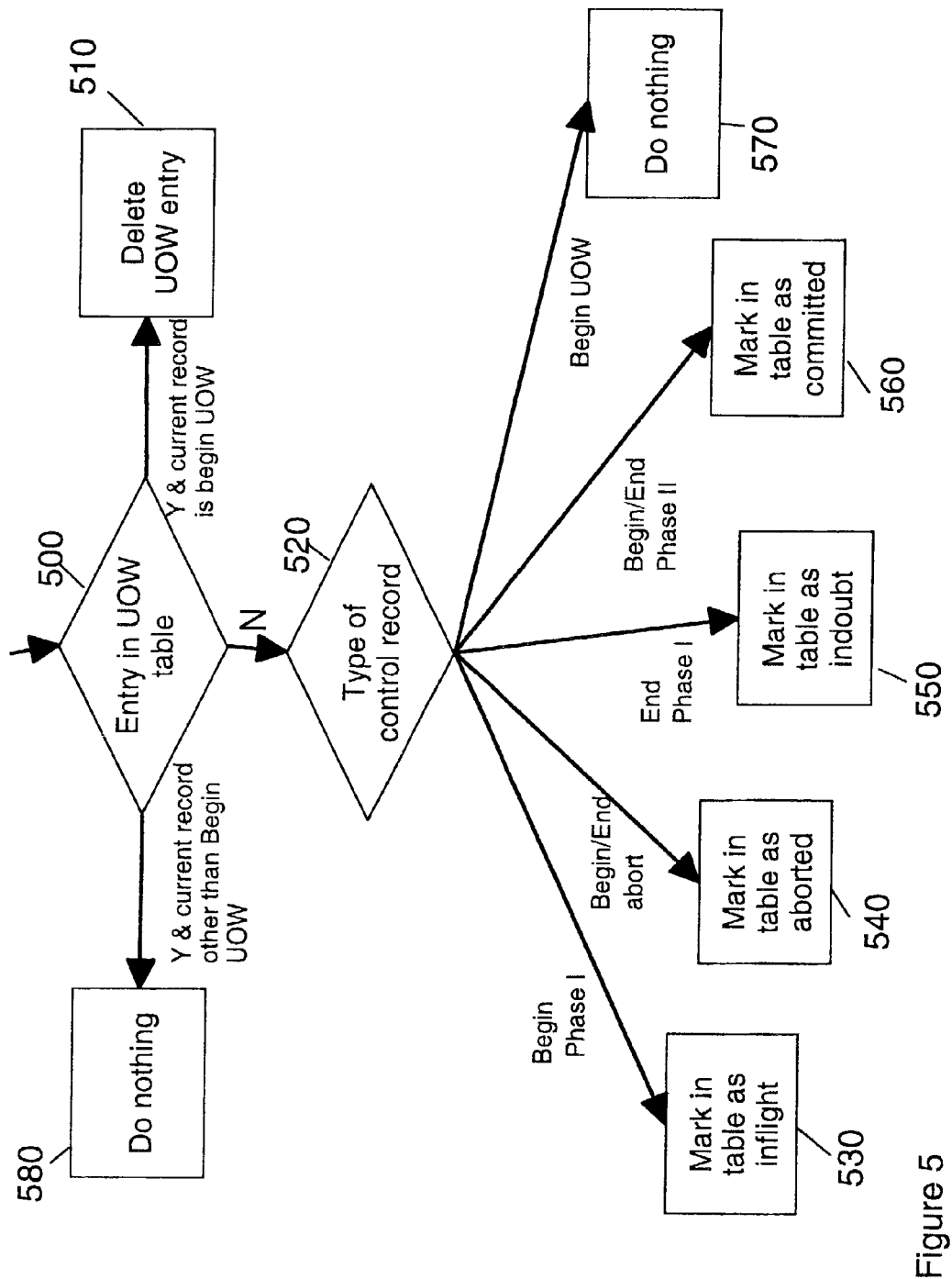
FIG. 5 shows the maintenance of a unit of work (UOW) table in accordance with a preferred embodiment of the present invention.

FIG. 4 shows the log records that make up a complete UOW (transaction) in a system using the two-phase commit protocol. In such a system, the finalising of a sequence of operations in a transaction may involve negotiation with a number of resource managers. Either all agree, or the transaction is not completed.

A UOW starts with a begin UOW control record. This is followed by a sequence of operations (inserts, updates and deletes). At the end of the unit of work the coordinating resource manager tells the participating resource manager to "prepare to commit", This is denoted by a "begin phase 1" control record. Once the UOW is prepared an "end phase I" record is written. At this point, with one resource manager acting as the coordinator, negotiation with the other resource managers occurs. Assuming that everyone agrees, the transaction is committed (finalised). The start of this process is initiated with a "begin phase II" control record. Once the transaction has been finalised an "end phase II" control record is written. Note, the transaction may be aborted at any time up until the "begin phase II" control record is written—see the abort control records of FIG. 4.

The period between the "end phase I" and "begin phase II" or "begin abort" log records is known as the "indoubt window" since the final disposition of the UOW is not known. In the event of any failure in this window the resource manager is obligated to hold any updates made during the UOW pending until the failure is resolved and communication can be restored with the coordinator. Note: If there are no other resource managers involved in a UOW a "phase I to II transition" log record can be written instead of separate "end phase I" and "begin phase II" records.

As each log record is processed from youngest to oldest (right to left in the diagrams), the control records are used to determine the state of each UOW and their corresponding records. This will be discussed with reference to FIG. 5.

Having come across a control record for a UOW, it is determined whether there is already an entry in the UOW table for this UOW (step 500). If there is, then the final state of the UOW has already been recorded. If the current control record is a "begin UOW" control record, then this UOW will not be re-encountered. Therefore the entry can be deleted from the UOW table (step 510). If there is an entry in the UOW table and the current control record is other than a "begin UOW", there is nothing more to do for this UOW (step 580).

If there is no entry in the UOW table, then this indicates that the state for the UOW has not yet been recorded. The type of control record therefore determines the final status recorded (step 520):

If it is a "begin phase I" control record, a final status of inflight is entered in the UOW table for the current UOW (step 530).

If it is a "begin" or "end" abort control record, a final status of aborted is entered in the UOW for the current UOW (step 540).

If it is an "end phase I" control record, a final status of indoubt is entered in the UOW table for the current UOW (step 550).

For "phase 1–2 transition"; "begin phase II"; and "end phase II", a final status of committed for the associated UOW is recorded in the UOW table (step 560).

It can be assumed that if no status has been recorded in the UOW table by the time the insert, update and delete sequence of records are reached that they are either inflight or aborted.

For a "begin UOW" control record, there is nothing to do for this UOW (step 570).

Having described the process of replaying the log using the key table and the UOW table, the actual contents of these two tables and the log itself will now be described for additional clarity, with reference to FIG. 3*d*.

The log 480 contains a record type (e.g. begin UOW, insert, update etc.); the UOW id of the UOW with which each record is associated; a unique key for the actual database record within the UOW; and the data itself.

The Key table 490 includes each database record's unique key; the status or disposition of the UOW at the time an entry was made for an associated database record; the record type (e.g. insert, update); and there is also a flag. As explained above, a flag is preferably used for an indoubt delete entry in the table and when set, this indicates that the most recent copy of that record has been recovered. (However, the flag could be set every time the most recent copy of a record is recovered, regardless of whether there is an indoubt delete pending—this is shown in the table 490)

The UOW table 495 holds the unique id of each UOW and the final state or disposition of that UOW (e.g. committed).

Figure 3D:
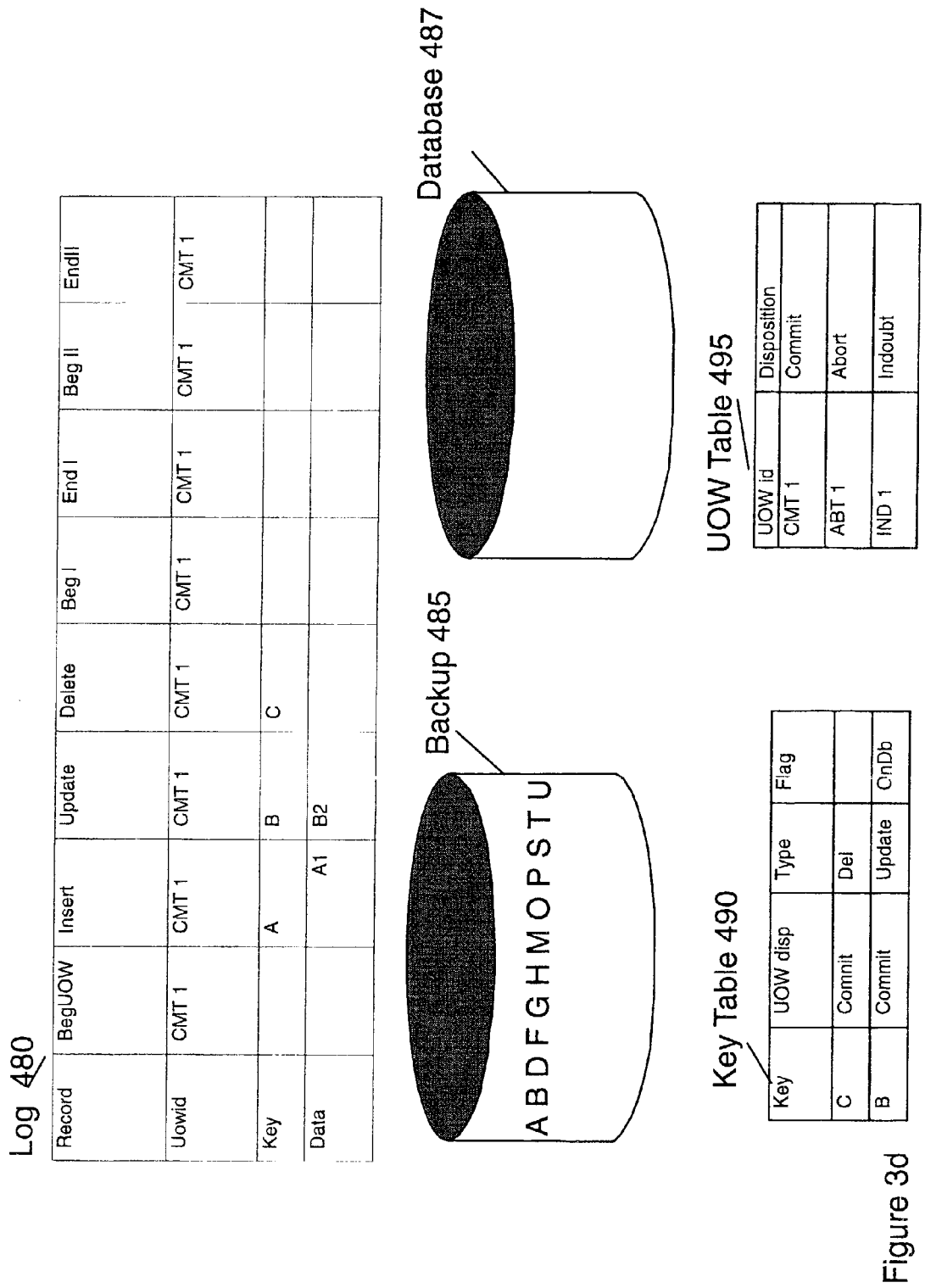
FIG. 3d shows the contents of the log, key table and UOW table in accordance with a preferred embodiment of the present invention.
Figure 6:
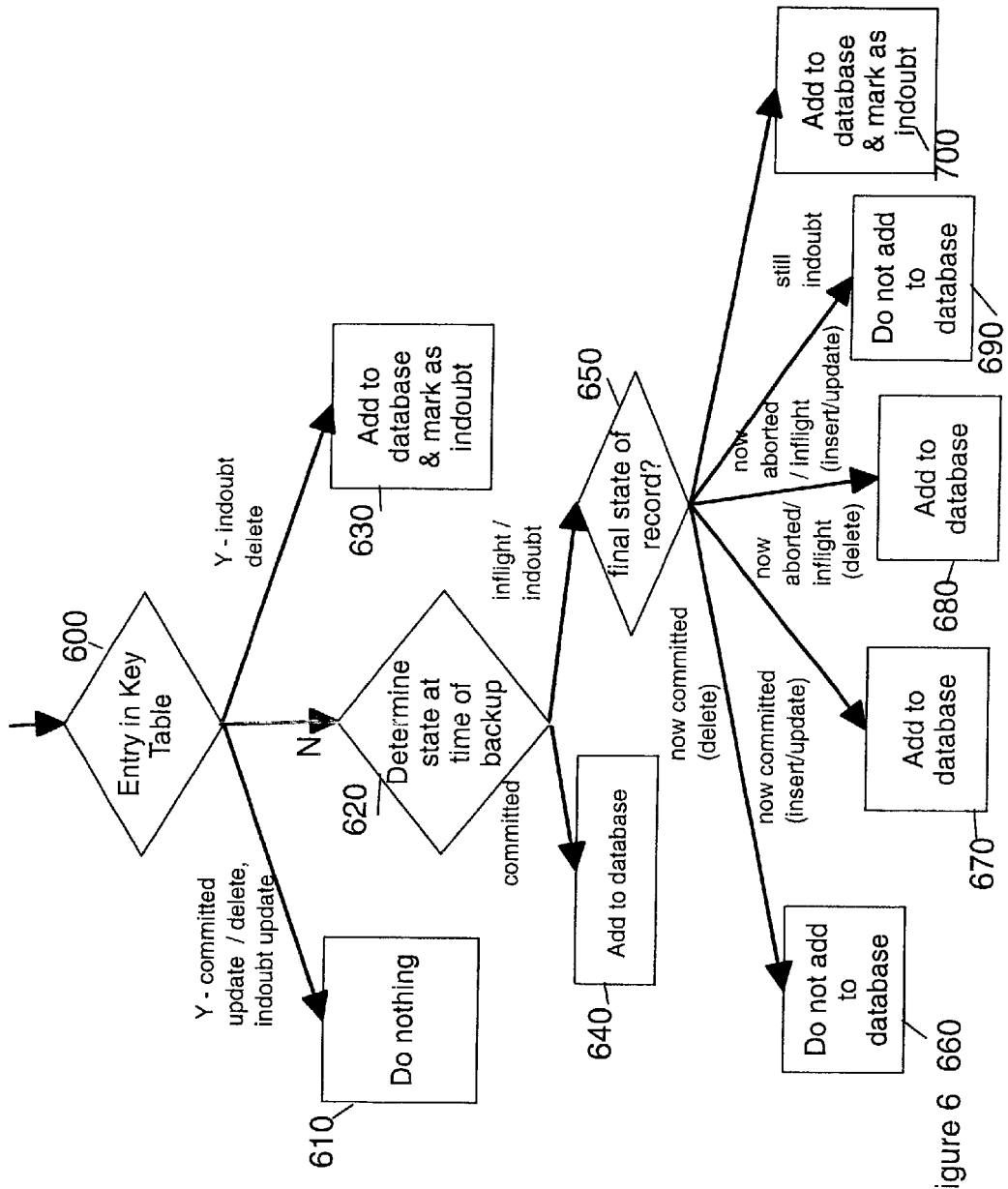
FIG. 6 shows the processing involved in restoring remaining records from the backup database in accordance with a preferred embodiment of the present invention.

Having replayed the log, any remaining records from the backup itself (485 of FIG. 3*d*) must be restored into the recovery database (487 of FIG. 3*d*). Note, the backup may be restored in a forwards direction since only the most recent copy of any record will be stored. This process will be discussed with reference to FIG. 6 below.

For each record in the backup, it is determined whether there is an entry for it in the key table (step 600).

If there is and it is for a committed update/delete, or an indoubt update there is no need to process the record (step 610). This is because the record has either been deleted or there is already a more recent copy of the record in the recovery database.

If there is an entry in the key table for an indoubt delete, then this record should be added to the database and marked as indoubt (step 630). (Note, the record is only added if the indoubt delete entry in the key table is not flagged. A flagged entry indicates that the most recent copy of the record is already in the recovery database.) This is because this record is the most recent copy of the record and since it has not yet finally been deleted, this record still needs to exist in the database.

If there is no entry in the key table, then this indicates that the database record has never subsequently been updated or deleted. The status of the record at backup time has to be determined (step 620).

If it was committed, then this is the final version of the record and it can be added to the database (step 640).

If it was inflight or indoubt at the time of backup, then the record's final status must be determined from the UOW table. (step 650)

If the record was for an inflight or indoubt delete which has now committed, the record should not be added to the database (i.e. it is subsequently deleted) (step 660).

If the record was for an inflight or indoubt update or insert which has now committed, the record should be added to the database (step 670).

If the record was for an inflight or indoubt delete which has now aborted or is still inflight, then it should be added to the database (step 680). This is because the delete never happened.

If the record was for an inflight or indoubt insert or update which subsequently aborted or is still inflight, it should not be added to the database (step 690).

If the record is still indoubt, it should be added to the database but marked as such (step 700).

To summarise, the traditional approach to media recovery is to restore the database from a backup and then to read the logs forward from the time of backup to the current time reapplying to the database all updates that have been made since the backup.

On the contrary, the present invention reads the log starting with the most recent log record and progressively replaying older log records. This has the following advantages:

Unnecessary updates to the database will not be made if a record is updated repeatedly or deleted in the period following the backup. I.e. older operations on a record will not be carried out.

The final disposition of a unit of work (UOW) is known at the time that insert/delete operations are replayed in the log, meaning that an informed decision can be made as to whether to process a log record. Thus, unlike the prior art, there is no need to defer changes until the disposition is known or undone if an incorrect assumption has been made.

With the prior art method of replaying the log, any attempts to improve performance by deferring database changes in case a subsequent update/delete is found require large amounts of storage since they must contain the entire record data. With the present invention, it is preferably only necessary to associate a unique key with the record.

What is claimed is:

1. A method for recovering data in a database of database records, following a failure of a media containing said database, said data recovery using a backup of the database and a log of log records detailing any changes in the database which are not captured in the backup, the method comprising the steps of:

replaying the log, starting with the most recent log record;

determining for each successive log record, that relates to an operation on a database record, whether processing the log record will result in the most recent state of the corresponding database record, and if so, processing the log record;

maintaining a list of each update and delete operation processed, and wherein the list is used in the determining step; and subsequently restoring additional data from the backup.

2. The method of claim 1, wherein the operations comprise inserts; updates; and deletes.

3. The method of claim 1 wherein the data being recovered is transactional and wherein some of the log records are control records, each control record being associated with at least one operation, the method comprising the step of:

determining the status of said operation based on the existence or absence of at least one particular control record, wherein the status of an operation is used in the determining step.

4. The method of claim 3, wherein the status of each operation comprises one of committed; aborted; inflight; and indoubt.

5. The method of claim 4, comprising the step of:

determining that the resulting state for a database record is an indoubt database record; and marking said database record as indoubt.

6. The method of claim 4, comprising the step of:

maintaining a list of each committed and indoubt update and delete operation processed, and wherein the list is used in the determining step.

7. The method of claim 6, comprising the steps of:

responsive to determining that a log record relates to a committed delete operation, processing the log record; and recording in the list that the corresponding database record has been deleted.

8. The method of claim 6 comprising:
   determining that a log record relates to an indoubt delete operation;
   recording in the list that a delete on the corresponding database record is indoubt.

9. The method of claim 8 comprising:
   determining that there is a log record denoting an operation on a database record for which there is an indoubt delete operation pending; and
   determining whether said denoting log record is for a committed operation and is the most recent successive log record following the indoubt delete log record; and
   responsive to determining that it is, processing the log record.

10. The method of claim 9 comprising:
    determining that the denoting log record is for a committed insert on a database record; and
    deleting the entry referring to that database record from the list.

11. The method of any of claim 6 comprising:
    determining that a log record relates to the most recent operation on a database record, said operation being an indoubt update or insert operation;
    processing the log record to update or insert the corresponding database record; and
    marking said updated or inserted database record as indoubt.

12. The method of claim 11 comprising:
    determining that the operation is an indoubt update; and
    recording in the list that the updated database record is indoubt.

13. The method of claim 4, wherein the step of restoring data from the backup comprises:
    determining for which database records, no operations were processed during the log replay step;
    determining which of said database records for which no operations were processed, were of committed status at the time of the backup; and
    restoring those committed records.

14. The method of claim 13, wherein the step of restoring from the backup further comprises:
    determining from the backup the initial status of each non-committed database record for which no operations were processed during the log replay step;
    determining from the log the final status of each non-committed database record; and
    determining whether to restore said non-committed database records from the backup based on said final status thereof.

15. The method of claim 14, comprising the step of:
    responsive to determining that a non-committed record for which no operations were processed during the log replay step was initially an inflight or indoubt delete which has a final state of committed, not restoring that record.

16. The method of claim 14, comprising the step of:
    responsive to determining that a non-committed record for which no operations were processed during the log replay step was initially for an inflight or indoubt insert or update, which has a final status of committed, restoring that record.

17. The method of claim 14, comprising the step of:
    responsive to determining that a non-committed record for which no operations were processed during the log replay step was initially for an inflight or indoubt delete, which has a final status of aborted, restoring that record.

18. The method of claim 14 comprising the step of:
    responsive to determining that a non-committed record for which no operations were processed during the log replay step was initially for an inflight or indoubt update or insert, which has a final status of aborted, not restoring that record.

19. The method of claim 14 comprising the step of:
    responsive to determining that the initial status of a non-committed record for which no operations were processed during the log replay step is inflight or indoubt and also that the final status of the new record is inflight or indoubt, restoring that record and marking that record with its state.

20. The method of claim 1, wherein the data being recovered is non-transactional, and wherein the step of restoring data from the backup comprises:
    determining for which database records, no log records were processed during the log replay step; and
    restoring said database records.

21. A method for recovering transactional data in a database following a failure of a media containing said database said data recovery using a backup of the database and a log of log records detailing any changes in the database which are not captured in the backup, the method comprising the step of:
    replaying the log, starting with the most recent log record;
    for each successive log record, that relates to an operation on a database record, determining whether processing the log record will result in the most recent state of the corresponding database record, and if so, processing the log record, the operation having a status which is used in the determining;
    maintaining a list of each update and delete operation processed and wherein the list is used in the determining step; and
    subsequently restoring additional data from the backup.

22. An apparatus for recovering data in a database of database records, following a failure of a media containing said database, said data recovery using a backup of the database and a log of log records detailing any changes in the database which are not captured in the backup, the apparatus comprising the steps of:
    means for replaying the log, starting with the most recent log record;
    means for determining for each successive log record, that relates to an operation on a database record, whether processing the log record will result in the most recent state of the corresponding database record, and if so, processing the log record;
    means for maintaining a list of each update and delete operation processed, and wherein the list is used by the determining means; and
    means for subsequently restoring additional data from the backup.

23. The apparatus of claim 22, wherein the operations comprise inserts; updates; and deletes.

24. The apparatus of claim 22 wherein the data being recovered is transactional and wherein some of the log records are control records, each control record being associated with at least one operation, the apparatus comprising:
    means for determining the status of said operation based on the existence or absence of at least one particular control record, wherein the status of an operation is used by the determining means.

25. The apparatus of claim 24, wherein the status of each operation comprises one of committed; aborted; inflight; and indoubt.

26. The apparatus of claim 25, comprising:
   means for determining that the resulting state for a database record is an indoubt database record; and
   means for marking said database record as indoubt.

27. The apparatus of claim 25, comprising:
   means for maintaining a list of each committed and indoubt update and delete operation processed, and wherein the list is used by the determining means.

28. The apparatus of claim 27, comprising:
   means, responsive to determining that a log record relates to a committed delete operation, for processing the log record; and
   means for recording in the list that the corresponding database record has been deleted.

29. The apparatus of claim 27 comprising:
   means for determining that a log record relates to an indoubt delete operation; and
   means for recording in the list that a delete on the corresponding database record is indoubt.

30. The apparatus of claim 29 comprising:
   means for determining that there is a log record denoting an operation on a database record for which there is an indoubt delete operation pending; and
   means for determining whether said denoting log record is for a committed operation and is the most recent successive log record following the indoubt delete log record; and
   means, responsive to determining that it is, for processing the log record.

31. The apparatus of claim 30 comprising:
   means for determining that the denoting log record is for a committed insert on a database record; and
   means for deleting the entry referring to that database record from the list.

32. The apparatus of claim 27 comprising:
   means for determining that a log record relates to the most recent operation on a database record, said operation being an indoubt update or insert operation;
   means for processing the log record to update or insert the corresponding database record; and
   means for marking said updated or inserted database record as indoubt.

33. The apparatus of claim 32 comprising
   means for determining that the operation is an indoubt update; and
   means for recording in the list that the updated database record is indoubt.

34. The apparatus of claim 25, wherein means for restoring data from the backup comprises:
   means for determining for which database records, no operations were processed during the log replay step;
   means for determining which of said database records for which no operations were processed, were of committed status at the time of the backup; and
   means for restoring those committed records.

35. The apparatus of claim 34, wherein the means for restoring from the backup further comprises:
   means for determining from the backup the initial status of each non-committed database record for which no operations were processed during the log replay step;
   means for determining from the log the final status of each non-committed database record; and
   means for determining whether to restore said non-committed database records from the backup based on said final status thereof.

36. The apparatus of claim 35, comprising:
   means, responsive to determining that a non-committed record for which no operations were processed during the log replay step was initially an inflight or indoubt delete which has a final state of committed, for not restoring that record.

37. The apparatus of claim 35, comprising:
   means, responsive to determining that a non-committed record for which no operations were processed during the log replay step was initially for an inflight or indoubt insert or update, which has a final status of committed, for restoring that record.

38. The apparatus of claim 35, comprising:
   means, responsive to determining that a non-committed record for which no operations were processed during the log replay step was initially for an inflight or indoubt delete, which has a final status of aborted, for restoring that record.

39. The apparatus of claim 35 comprising:
   means, responsive to determining that a non-committed record for which no operations were processed during the log replay step was initially for an inflight or indoubt update or insert, which has a final status of aborted, for not restoring that record.

40. The apparatus of claim 35 comprising:
   means, responsive to determining that the initial status of a non-committed record for which no operations were processed during the log replay step is inflight or indoubt and also that the final status of the new record is inflight or indoubt, for restoring that record and marking that record with its state.

41. The apparatus of claim 22, wherein the data being recovered is non-transactional, and wherein the means for restoring data from the backup comprises:
   means for determining for which database records, no log records were processed during the log replay step; and
   means for restoring said database records.

42. An apparatus for recovering transactional data in a database following a failure of a media containing said database, said data recovery using a backup of the database and a log of log records detailing any changes in the database which are not captured in the backup, the apparatus comprising:
   means for replaying the log, starting with the most recent log record;
   for each successive log record, that relates to an operation on a database record, means for determining whether processing the log record will result in the most recent state of the corresponding database record, and if so, processing the log record, the operation having a status which is used by the determining means;
   Means for maintaining a list of each update and delte operation processed, and wherein the list is used by the determining means; and
   means for subsequently restoring additional data from the backup.

43. A computer program comprising program code means adapted to perform the method of claim 1, when said program is run on a computer.

44. A system for recovering data in a database of database records, following a failure of a media containing said database, said data recovery using a backup of the database and a log of log records detailing any changes in the database which are not captured in the backup, the system comprising:
   means for replaying the log, starting with the most recent log record;
   means for determining for each successive log record, that relates to an operation on a database record, whether processing the log record will result in the most recent state of the corresponding database record, and if so, processing the log record;

Means for maintaining a list of each update and delete operation processed, and wherein the list is used by the determining means; and means for subsequently restoring additional data from the backup.

45. A system for recovering transactional data in a database following a failure of a media containing said database, said data recovery using a backup of the database and a log of log records detailing any changes in the database which are not captured in the backup, the system comprising:

means for replaying the log, starting with the most recent log record;

for each successive log record, that relates to an operation on a database record, means for determining whether processing the log record will result in the most recent state of the corresponding database record, and if so, processing the log record, the operation having a status which is used by the determining means; and Means for maintaining a list of each update and delete operation processed, and wherein the list is used by the determining means; and means for subsequently restoring additional data from the backup.

* * * * *